United States Patent Office.

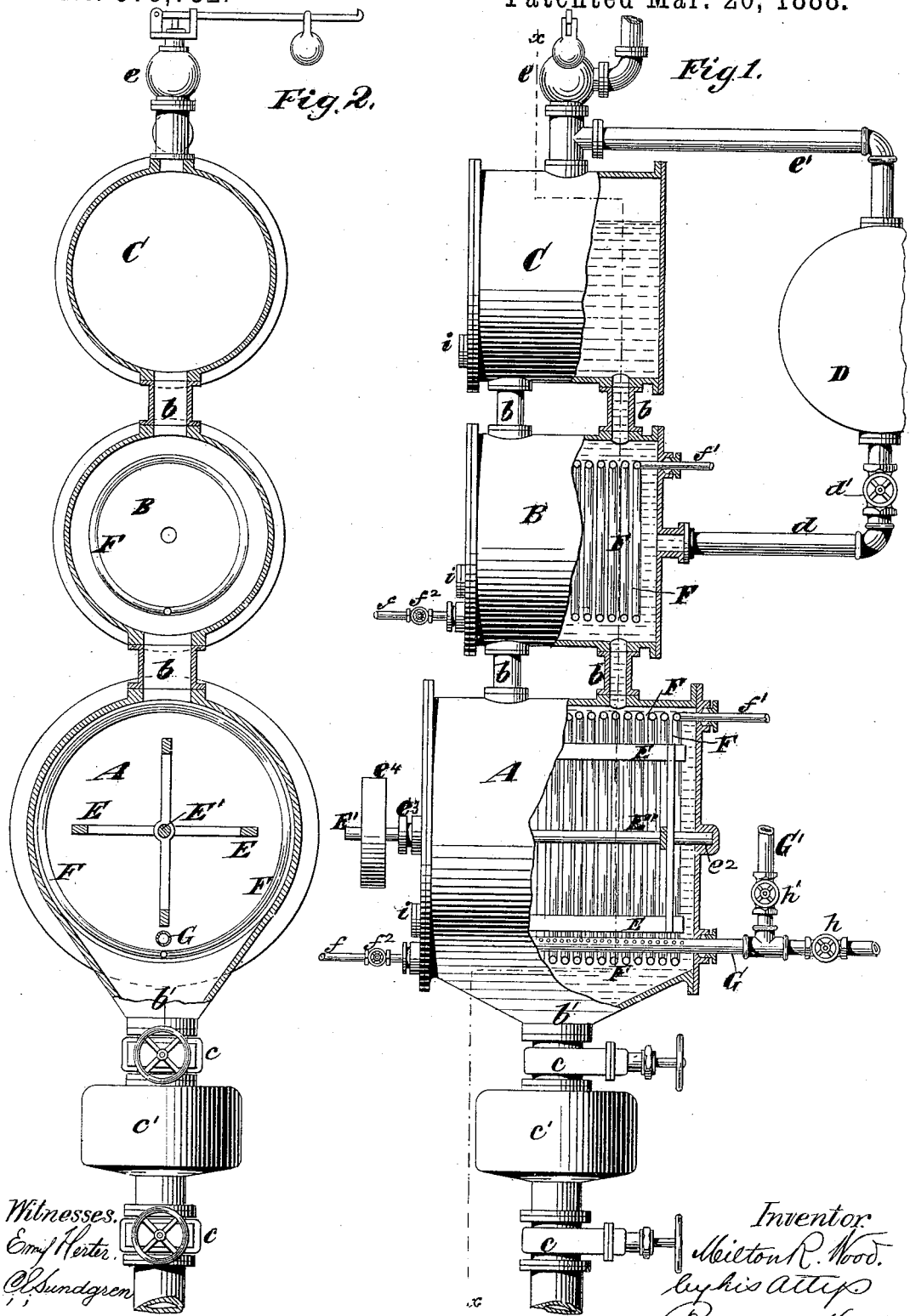

MILTON R. WOOD, OF BROOKLYN, NEW YORK.

APPARATUS FOR THE MANUFACTURE OF SODA.

SPECIFICATION forming part of Letters Patent No. 379,752, dated March 20, 1888.

Application filed September 15, 1886. Serial No. 213,549. (No model.)

*To all whom it may concern:*

Be it known that I, MILTON R. WOOD, of Brooklyn, in the county of Kings and State of New York, have invented a new and useful Improvement in Apparatus for the Manufacture of Monocarbonate and Bicarbonate of Soda and Allied Products, of which the following is a specification.

My invention relates to the manufacture of monocarbonate and bicarbonate of soda by what is known as the "ammonia method," which consists, in its essential principles, in introducing carbonic-acid gas into a brine solution previously saturated with a desired quantity of ammoniacal gas. In order to successfully carry out such method it is necessary that there be a perfect mixing of the gas or gases with the solution, and that there shall also be a thorough absorption of the gases by the solution and an absorption of the heat produced by the chemical action.

In carrying out the ammoniacal method it is found that the best results are obtained where the carbonic-acid gas is introduced in the lower portion of a body of liquid, so that all the gases which do not immediately combine with the solution will pass upward and will be utilized in charging the upper portion of the brine under treatment.

An important object of my invention is to provide for carrying out the method with a quantity of liquid, forming a hydrostatic column, and at the same time to maintain substantially a specific and smaller body of solution, in which the gas is first introduced and on which it primarily acts; also, to provide for the proper agitation of the solution in the primary vessel, or that portion of the solution which constitutes the substantially specific body on which the gas first acts, and also to provide for the absorption and conducting away of heat generated by the chemical action.

The method which is carried out by my present apparatus forms the subject of my application for Letters Patent, Serial No. 248,438, filed September 1, 1887.

My present invention consists in the combination, in an apparatus for the manufacture of monocarbonate and bicarbonate of soda and allied products, of a lower primary vessel and one or more secondary vessels superposed one above another, and unobstructed and constantly-open throats or passages connecting the top of each vessel with the bottom of the vessel next above, thereby adapting the vessels for containing substantially specific and limited bodies of liquor which will fill all the vessels except the upper one, and which, through the throats or passages, form in effect a single hydrostatic column, an inlet-passage for liquor to one of the secondary vessels, an agitator, and a coil for the circulation of a refrigerant, arranged in one or more of the vessels.

In the accompanying drawings, Figure 1 is a partly-sectional elevation of an apparatus embodying my invention; and Fig. 2 is a sectional elevation upon the plane of the dotted line *x x*, Fig. 1.

Similar letters of reference designate corresponding parts in both figures.

A designates a lower primary vessel, and B C designate two secondary vessels, which are superposed one above another and both above the primary vessel A. One or more secondary vessels may be employed in connection with a primary vessel, and the several vessels are connected together, the upper part of each being connected by one or more throats or passages, *b*, with the bottom of the vessel next above. I have here shown two throats or passages *b* as connecting each vessel A B with the vessel above it, and these throats or passages are entirely unobstructed and constantly open. The vessels may be of cast-iron or other suitable material, and of any form which will withstand the internal pressure produced within them in the chemical action. They may advantageously consist of cylinders arranged with their axes horizontal, as here shown, and closed at the ends by suitable heads. The primary vessel A has a discharge-throat, *b'*, with which is connected a discharging apparatus or trap, formed by two valves, *c*, having between them a chamber or pocket, *c'*. The apparatus may be operated in this way intermittently, or the flow of the product from the primary vessel may be continuous and be controlled by a single valve at the outlet-throat *b'*.

D designates a supply-tank, which may be of any suitable capacity, and from the bottom of which a pipe, *d*, leads to the inlet-passage of the secondary vessel B. The upper secondary vessel, C, may be surmounted by a safety-valve, e, and from said vessel may lead a pipe, e', to the upper part of the supply-tank D. By such an arrangement of parts an equilibrium of pressure will be maintained between the vessels A B C and the supply-tank D, and the solution may flow from said tank to the secondary vessel B under control of a valve, d', in the pipe d.

Within the primary vessel A is arranged an agitator, E, which may be formed by suitable blades or wings radiating from a central shaft, E', and this shaft may have a socket-bearing, $e^2$, in one head of the vessel A, and may project through a stuffing-box, $e^3$, in the other, and be provided with a pulley, $e^4$, to receive a driving-belt. I have also shown the primary vessel A as provided with a coil, F, with which communicates at one end a supply-pipe, f, and from the other end of which leads a delivery-pipe, f'. The flow of a refrigerating medium—such as cold brine—through the coil F may be controlled by a valve, $f^2$, in the pipe f, and by such refrigerant the heat generated by the chemical combination of the gas with the brine will be absorbed and conducted away. I have also shown a similar coil F, for the circulation of a refrigerant, arranged in the first secondary vessel and provided with supply-pipes f and delivery-pipe f', as before described. I may also, if desired, arrange an agitator within the secondary vessel B.

G designates a gas-pipe which extends into the primary vessel A, and which may be perforated for the distribution of the gas passing through it and entering the vessel A, in order that a more perfect and complete action of the gas upon the solution may result. The flow of gas through the pipe G from a carbonic-acid-gas generator may be controlled by a valve, h, and with the pipe G may be connected a branch pipe, G', in which is a valve, h', and which may lead from an ammoniacal-gas generator.

In the operation of the apparatus I prefer usually to use a brine solution which has been previously charged with a desired quantity of ammoniacal gas, and if the apparatus be always used in this way a simple gas-pipe, G, leading from the carbonic-acid-gas generator will be all that is required. I may, however, charge the apparatus with a simple brine solution, and then first introduce the ammoniacal gas through the branch pipe G' and the pipe G, and afterward shut off the flow of ammoniacal gas and introduce the carbonic-acid gas to produce chemical action. The chemical action of the carbonic-acid gas upon the brine solution which has been charged with ammoniacal gas will produce bicarbonate of soda which is insoluble in the solution of chloride of ammonium, and the product of the apparatus will be drawn off in the form of an emulsion or milky fluid from the outlet-throat b', after which the bicarbonate may be separated by a centrifugal machine or vacuum-filter in a well-known manner.

It is advantageous to employ a number of vessels arranged one above another and communicating with each other by contracted throats or passages, as described, so as to form in effect a single hydrostatic column, as by such means a substantially specific body of solution is maintained in the lower vessel, on which the gas primarily and most effectively acts, and any gas which may not combine with the solution in the primary vessel escapes upward through the throats or connections into the secondary vessel or vessels, and is there utilized in charging the solution preparatory to its descent to the primary vessel, where a more active chemical action takes place.

I have here represented the supply-tank D as smaller in size than it should be as compared with the vessels A B C for the purpose of reducing the size of the drawings; but it will be understood that said tank may be of any suitable size. I have also shown in the end of each of the vessels A B C a man-hole, i, which may be closed by a suitable plate or bonnet, and through which access may be had to the vessels for inspection, repair, or cleaning.

I am aware that it is not new in various chemical manufactures to employ a number of vessels connected so that the gas or liquor may be passed from one to another of them, and I do not, in general terms, claim such a construction as of my invention.

I am also aware of the construction and combination of parts shown and described in British Patent No. 4,491 of 1881, and I do not include such an apparatus in my invention. My apparatus is distinguished from that which forms the subject of the said British patent in having primary and secondary vessels which are superposed one above another and connected by throats or passages which are unobstructed and constantly open and which lead from the top of one vessel to the bottom of the vessel next above. These constantly open and unobstructed throats and passages provide for holding in the series of vessels a quantity of liquid sufficient to fill all the vessels excepting the top one and to partially fill the top one. My apparatus is also distinguished from that shown in the British patent in having a gas-inlet to the primary vessel and an inlet for liquor to one of the secondary vessels, and with my apparatus a method of operation is possible which is wholly impossible with the apparatus shown in the British patent. My construction and combination provide for maintaining in the apparatus substantially specific and limited bodies of liquor in the several vessels, but which, owing to the constantly-open throats or passages, form in effect a single hydrostatic column. Owing to my construction I secure the passage of gas from the lower vessel upward through all the vessels of the series and through the entire depth of liquor in the hydrostatic column, and inasmuch as the liquor-inlet is to one of the secondary vessels and as the entering liquor is lighter than that which is partially charged with gas, and therefore has a tendency to rise, the entering liquor and gas rise together, and opportunity is afforded for the more complete action of the gas upon the liquor.

What I claim as my invention, and desire to secure by Letters Patent, is—

In an apparatus for the manufacture of monocarbonate and bicarbonate of soda or allied products, the combination of a lower primary vessel and one or more secondary vessels superposed one above another, and unobstructed and constantly-open throats or passages connecting the top of each vessel with the bottom of the vessel next above, thereby adapting the vessels for containing substantially specific and limited bodies of liquor which will fill all the vessels except the upper one, and which, through the throats or passages, form in effect a single hydrostatic column, an inlet-passage for liquor to one of the secondary vessels, and an agitator and a coil for the circulation of a refrigerant, arranged in one or more of the vessels, and a pipe for introducing gas into the primary vessel, whereby the gas is caused to ascend freely through the entire body of liquor in the vessels in succession and the entering liquor is free to rise with the gas, substantially as herein described.

MILTON R. WOOD.

Witnesses:
C. HALL,
FREDK. HAYNES.